United States Patent
Ji et al.

(10) Patent No.: US 10,801,869 B2
(45) Date of Patent: Oct. 13, 2020

(54) ULTRASONIC FLOWRATE MEASUREMENT DEVICE HAVING AN ATTACHMENT PORTION WITH RECEIVERS FOR DETERMINING SIZE OF A PIPE

(71) Applicants: ORDOS YUANSHENG OPTOELECTRONICS CO., LTD., Ordos, Inner Mongolia (CN); BOE TECHNOLOGY GROUP CO., LTD., Beijing (CN)

(72) Inventors: Dong Ji, Beijing (CN); Feng Luo, Beijing (CN); Nan Zhang, Beijing (CN); Guoliang Liu, Beijing (CN); Da Liu, Beijing (CN); Xiaodong Fang, Beijing (CN); Jialin Huang, Beijing (CN); Guoqiang Zhao, Beijing (CN); Jie Liu, Beijing (CN)

(73) Assignees: ORDOS YUANSHENG OPTOELECTRONICS CO., LTD., Ordos, Inner Mongolia (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/333,826

(22) PCT Filed: Apr. 10, 2018

(86) PCT No.: PCT/CN2018/082477
§ 371 (c)(1),
(2) Date: Mar. 15, 2019

(87) PCT Pub. No.: WO2018/219046
PCT Pub. Date: Dec. 6, 2018

(65) Prior Publication Data
US 2019/0257680 A1    Aug. 22, 2019

(30) Foreign Application Priority Data

May 27, 2017    (CN) .......................... 2017 1 0390669

(51) Int. Cl.
*G01F 1/66*          (2006.01)

(52) U.S. Cl.
CPC .................. *G01F 1/667* (2013.01); *G01F 1/66* (2013.01)

(58) Field of Classification Search
None
See application file for complete search history.

(56) References Cited

U.S. PATENT DOCUMENTS

| 4,019,373 A * | 4/1977 | Freeman ................. G01F 1/662 |
| | | 73/644 |
| 5,179,862 A * | 1/1993 | Lynnworth ............. G01F 1/662 |
| | | 73/861.28 |

(Continued)

FOREIGN PATENT DOCUMENTS

| CN | 101097161 A | 1/2008 |
| CN | 202092690 U | 12/2011 |

(Continued)

OTHER PUBLICATIONS

International Search Report; Application No. PCT/CN2018/082477; dated Jun. 28, 2018; English Translation Attached.

(Continued)

*Primary Examiner* — Harshad R Patel
(74) *Attorney, Agent, or Firm* — Nath, Goldberg & Meyer; Joshua B. Goldberg

(57) ABSTRACT

Provided are a flowrate measurement device and a flowrate measurement method. The flowrate measurement device includes an attachment portion configured to attach the flowrate measurement device to an object to be measured, and a measurement portion. The measurement portion (Continued)

includes a first ultrasonic transmitter, a second ultrasonic transmitter and a plurality of signal receivers between the first ultrasonic transmitter and the second ultrasonic transmitter. The plurality of signal receivers are spaced apart from each other. The first ultrasonic transmitter, the second ultrasonic transmitter and the plurality of the signal receivers are all disposed on the attachment portion, such that both the first ultrasonic transmitter and the second ultrasonic transmitter are capable of emitting an ultrasonic wave signal to the object to be measured. The signal receivers are capable of receiving an ultrasonic wave signal reflected from the object to be measured.

13 Claims, 2 Drawing Sheets

(56) References Cited

U.S. PATENT DOCUMENTS

| | | | | |
|---|---|---|---|---|
| 6,273,373 | B1* | 8/2001 | Baumoel | G01B 5/0002 |
| | | | | 248/73 |
| 7,669,483 | B1* | 3/2010 | Feller | G01F 1/662 |
| | | | | 24/279 |
| 8,347,734 | B2 | 1/2013 | Berger et al. | |
| 2008/0060448 | A1* | 3/2008 | Wiest | G01F 1/662 |
| | | | | 73/861.27 |
| 2008/0250870 | A1* | 10/2008 | Rhodes | G01F 1/667 |
| | | | | 73/861.27 |
| 2009/0025487 | A1* | 1/2009 | Gysling | G01F 1/662 |
| | | | | 73/861.25 |
| 2010/0257941 | A1* | 10/2010 | Gysling | G01F 1/667 |
| | | | | 73/861.28 |
| 2011/0094309 | A1* | 4/2011 | Berger | G01F 1/662 |
| | | | | 73/861.28 |
| 2011/0196624 | A1* | 8/2011 | Hackett, III | G01F 1/667 |
| | | | | 702/45 |
| 2012/0167688 | A1* | 7/2012 | Minachi | G01B 17/02 |
| | | | | 73/602 |
| 2014/0366642 | A1* | 12/2014 | Tanaka | G01F 1/662 |
| | | | | 73/861.27 |
| 2015/0279072 | A1* | 10/2015 | Black | G06T 11/60 |
| | | | | 382/109 |
| 2016/0025537 | A1* | 1/2016 | Barkin | G01F 1/667 |
| | | | | 73/861.27 |
| 2016/0033312 | A1* | 2/2016 | Ryu | G01F 1/662 |
| | | | | 73/861.27 |
| 2016/0069731 | A1* | 3/2016 | Sasaki | G01F 1/667 |
| | | | | 73/1.34 |
| 2017/0160240 | A1* | 6/2017 | Fan | G01F 1/662 |
| 2017/0275986 | A1* | 9/2017 | Nunes | G01H 9/004 |
| 2018/0156650 | A1* | 6/2018 | Nagareda | G01F 1/662 |
| 2018/0164144 | A1* | 6/2018 | Ploss | G01F 25/0007 |
| 2018/0238725 | A1* | 8/2018 | Black | G01F 1/66 |
| 2019/0257680 | A1 | 8/2019 | Ji et al. | |

FOREIGN PATENT DOCUMENTS

| | | |
|---|---|---|
| CN | 102359802 A | 2/2012 |
| CN | 103471670 A | 12/2013 |
| CN | 203848888 U | 9/2014 |
| CN | 105181050 A | 12/2015 |
| CN | 205228545 U | 5/2016 |
| CN | 107144313 A | 9/2017 |
| JP | 2004108946 A | 4/2004 |

OTHER PUBLICATIONS

First Office Action Corresponding to Chinese Application No. 201710390669.X; dated Jul. 25, 2018; English Translation Attached.
Second Office Action Corresponding to Chinese Application No. 201710390669.X; dated Nov. 15, 2018; English Translation Attached.

* cited by examiner

ULTRASONIC FLOWRATE MEASUREMENT DEVICE HAVING AN ATTACHMENT PORTION WITH RECEIVERS FOR DETERMINING SIZE OF A PIPE

CROSS-REFERENCE TO RELATED APPLICATIONS

This is a National Phase Application filed under 35 U.S.C. 371 as a national stage of PCT/CN2018/082477, filed Apr. 10, 2018, an application claiming the benefit of Chinese Patent Application No. 291710390669.X, filed May 27, 2017, the content of each of which is incorporated herein by reference in its entirety.

TECHNICAL FIELD

The present disclosure relates to the field of flowrate measurement, and in particular, to a flowrate measurement device and a flowrate measurement method.

BACKGROUND

Flowrate measurement plays an important role in many industrial processes involving fluid pipes, such as chemical production, pharmaceutical synthesis, fine chemicals, and electronic circuit substrate etching. Production equipment is usually provided with fixed flowmeters, such as speed flowmeters, volumetric flowmeters, and momentum flowmeters. However, those flowmeters are characterized by being mounted in fixed positions and can only be installed on key pipes. Ultrasonic flowmeters are non-contact meters that have been in use with rapid development of integrated circuit technology for more than a decade, and are suitable for measuring fluids that are difficult to contact and observe as well as a flowrate in a pipe with a large diameter.

SUMMARY

Provided is a flowrate measurement device capable of measuring a pipe with an unknown pipe diameter.

As an aspect of the disclosure, provided is a flowrate measurement device including an attachment portion configured to attach the flowrate measurement device to an object to be measured, and a measurement portion, wherein the measurement portion includes a first ultrasonic transmitter, a second ultrasonic transmitter and a plurality of signal receivers, the plurality of signal receivers are spaced apart from each other, the first ultrasonic transmitter, the second ultrasonic transmitter and the plurality of the signal receivers are all disposed on the attachment portion, such that both the first ultrasonic transmitter and the second ultrasonic transmitter may emit an ultrasonic wave signal to the object to be measured, the signal receivers may receive an ultrasonic wave signal reflected from the object to be measured, the plurality of signal receivers include a first signal receiver disposed at a same position as the first ultrasonic transmitter, a second signal receiver disposed at a same position as the second ultrasonic transmitter, and a plurality of third signal receivers between the first signal receiver and the second signal receiver, and the second ultrasonic transmitter may emit an ultrasonic wave signal in a case that the second signal receiver receives the ultrasonic wave signal reflected from the object to be measured.

In some implementations, the flowrate measurement device further includes a controller capable of determining a size of the object to be measured according to a position of a third signal receiver that receives the ultrasonic wave signal reflected from the object to be measured, and determining a flowrate of the fluid in the object to be measured according to time when the first ultrasonic transmitter emits the ultrasonic wave signal, time when the ultrasonic wave signal is received by the first signal receiver, and the size of the object to be measured.

In some implementations, the object to be measured is a pipe, and the controller may calculate the flowrate of the fluid in the object to be measured according to the following formula:

$$Q = Agu = \frac{\pi D^2}{4} g \frac{C_0^2 \sin\theta}{2D \cos\theta} \Delta t;$$

where Q is the flowrate;
A is a cross-sectional area of the pipe;
u is a flow velocity of a fluid in the pipe;
D is a diameter of the pipe;
θ is an emission angle of the first ultrasonic transmitter, and is an angle between an emission direction of the first ultrasonic transmitter and a vertical direction;
$C_0$ is a speed at which sound travels in a fluid; and
Δt is a time interval between emission of the ultrasonic wave signal by the first ultrasonic transmitter and reception of the ultrasonic wave signal by the first signal receiver.

In some implementations, an emission angle of the first ultrasonic transmitter is adjustable, and an emission angle of the second ultrasonic transmitter is adjustable, and the controller may calculate the diameter of the object to be measured according to the following formula:

$$D = \frac{L}{2 \tan\theta},$$

where L is a distance between the first ultrasonic transmitter and a third signal receiver that first receives the ultrasonic wave signal reflected from a pipe wall after the first ultrasonic transmitter emits the ultrasonic wave signal.

In some implementations, the plurality of third signal receivers are evenly spaced.

In some implementations, the flowrate measurement device includes a display device for displaying a measurement result.

In some implementations, the flowrate measurement device further includes a storage device for storing a measurement result.

In some implementations, the attachment portion includes a mounting plate and two clamping plates separately disposed on two sides of the mounting plate. The measurement portion is mounted on the mounting plate. A gap between the two clamping plates is adjustable.

In some implementations, the flowrate measurement device further includes a power supply device for supplying power to the flowrate device.

In some implementations, the flowrate measurement device further includes an input device for inputting an operation instruction.

As a second aspect of the disclosure, provided is a flowrate measurement method which includes:

providing a first ultrasonic transmitter, a plurality of signal receivers and a second ultrasonic transmitter on a surface of an object to be measured, wherein the signal receivers may receive an ultrasonic wave signal reflected from the object to be measured, and the plurality of signal receivers include a first signal receiver disposed at a same position as the first ultrasonic transmitter, a second signal receiver disposed at a same position as the second ultrasonic transmitter, and a plurality of third signal receivers between the first signal receiver and the second signal receiver;

activating the first ultrasonic transmitter to emit an ultrasonic wave signal to the object to be measured;

activating the second ultrasonic transmitter to emit an ultrasonic wave signal to the object to be measured in a case that the second signal receiver receives the ultrasonic wave signal reflected from the object to be measured;

determining a size of the object to be measured according to a position of a third signal receiver that receives the ultrasonic wave signal reflected from the object to be measured; and determining a flowrate of a fluid in the object to be measured according to time when the first ultrasonic transmitter emits the ultrasonic wave signal, time when the ultrasonic wave signal is received by the first signal receiver, and the size of the object to be measured.

In some implementations, the object to be measured is a pipe.

The step of determining a flowrate of the fluid in the object to be measured according to time when the first ultrasonic transmitter emits the ultrasonic wave signal, time when the ultrasonic wave signal is received by the first signal receiver, and the size of the object to be measured includes: calculating the flowrate of the fluid in the object to be measured according to the following formula:

$$Q = Agu = \frac{\pi D^2}{4} g \frac{C_0^2 \sin\theta}{2D \cos\theta} \Delta t;$$

where Q is the flowrate;
A is a cross-sectional area of the pipe;
u is a flow velocity of a fluid in the pipe;
D is a diameter of the pipe;
θ is an emission angle of the first ultrasonic transmitter, and is an angle between an emission direction of the first ultrasonic transmitter and a vertical direction;
$C_0$ is a speed at which sound travels in a fluid; and
Δt is a time interval between emission of the ultrasonic wave signal by the first ultrasonic transmitter and reception of the ultrasonic wave signal by the first signal receiver.

In some implementations, the step of determining a size of the object to be measured according to a position of a third signal receiver that receives the ultrasonic wave signal reflected from the object to be measured includes: calculating a diameter of the object to be measured according to the following formula:

$$D = \frac{L}{2\tan\theta};$$

where L is a distance between the first ultrasonic transmitter and a third signal receiver that first receives the ultrasonic wave signal reflected from a pipe wall after the first ultrasonic transmitter emits the ultrasonic wave signal.

BRIEF DESCRIPTION OF THE DRAWINGS

The drawings, which constitute a part of the specification, are provided for purposes of further understanding the present disclosure and illustrating the present disclosure along with the specific implementations below, without limiting the present disclosure. In the drawings.

DETAILED DESCRIPTION

The specific embodiments of the present disclosure will be described in detail below with reference to the accompanying drawings. It should be understood that the specific embodiments described herein are for purposes of illustrating and explaining the present disclosure, without limiting the present disclosure.

Figure 1:
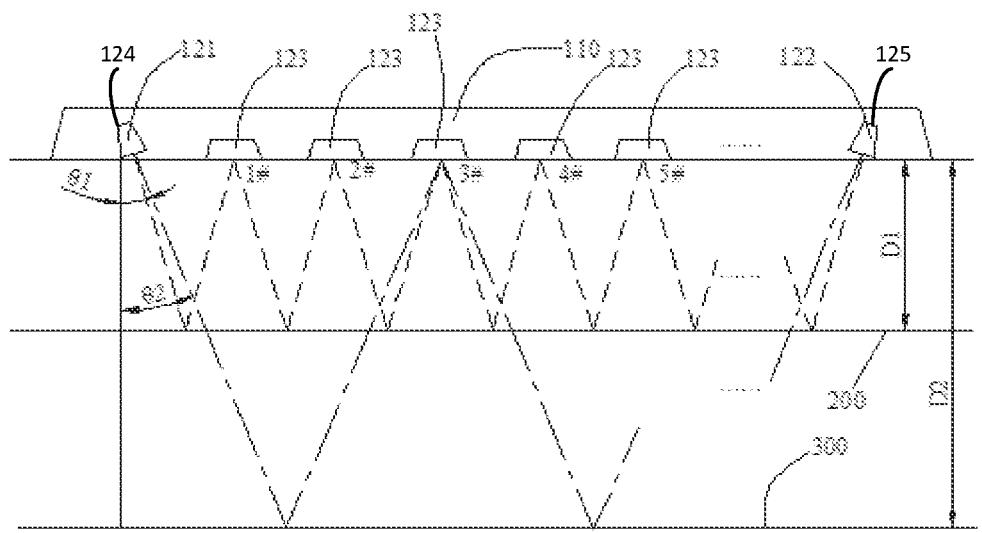
FIG. 1 is a schematic diagram illustrating the principle of a flowrate measurement device according to the present disclosure.

A flowrate measurement device is provided according to an embodiment of the disclosure. As shown in FIG. 1, the flowrate measurement device includes an attachment portion 110 and a measurement portion. The attachment portion 110 is configured to attach the flowrate measurement device to an object to be measured (i.e., a pipe), wherein the measurement portion includes a first ultrasonic transmitter 121, a second ultrasonic transmitter 122 and a plurality of signal receivers 123 between the first ultrasonic transmitter 121 and the second ultrasonic transmitter 122.

The first ultrasonic transmitter 121, the second ultrasonic transmitter 122 and the plurality of signal receivers 123 are all disposed on the attachment portion 110, such that both the first ultrasonic transmitter 121 and the second ultrasonic transmitter 122 are capable of emitting an ultrasonic wave signal to the object to be measured.

The plurality of signal receivers may receive an ultrasonic wave signal reflected from the object to be measured, and include a first signal receiver 124 disposed at a same position as the first ultrasonic transmitter 121, a second signal receiver 125 disposed at a same position as the second ultrasonic transmitter 122, and a plurality of third signal receivers 123 between the first signal receiver and the second signal receiver.

The second ultrasonic transmitter 122 is capable of emitting an ultrasonic wave signal in a case that the second signal receiver receives the ultrasonic wave signal reflected from the object to be measured.

For ease of understanding, a principle for measuring a flowrate of a fluid by using an ultrasonic wave signal will be briefly introduced.

When an ultrasonic wave signal propagates in a fluid, the ultrasonic wave signal carries flow velocity information of the fluid due to an influence of the fluid velocity. The flow velocity of the fluid may be measured by detecting a received ultrasonic wave signal, thereby obtaining a flowrate of the fluid. Methods for measuring a flowrate by using the ultrasonic wave signal include a propagation velocity method, a Doppler method, a beam offset method, a noise method, a correlation method, a flow velocity and cross section method and the like.

Figure 2:
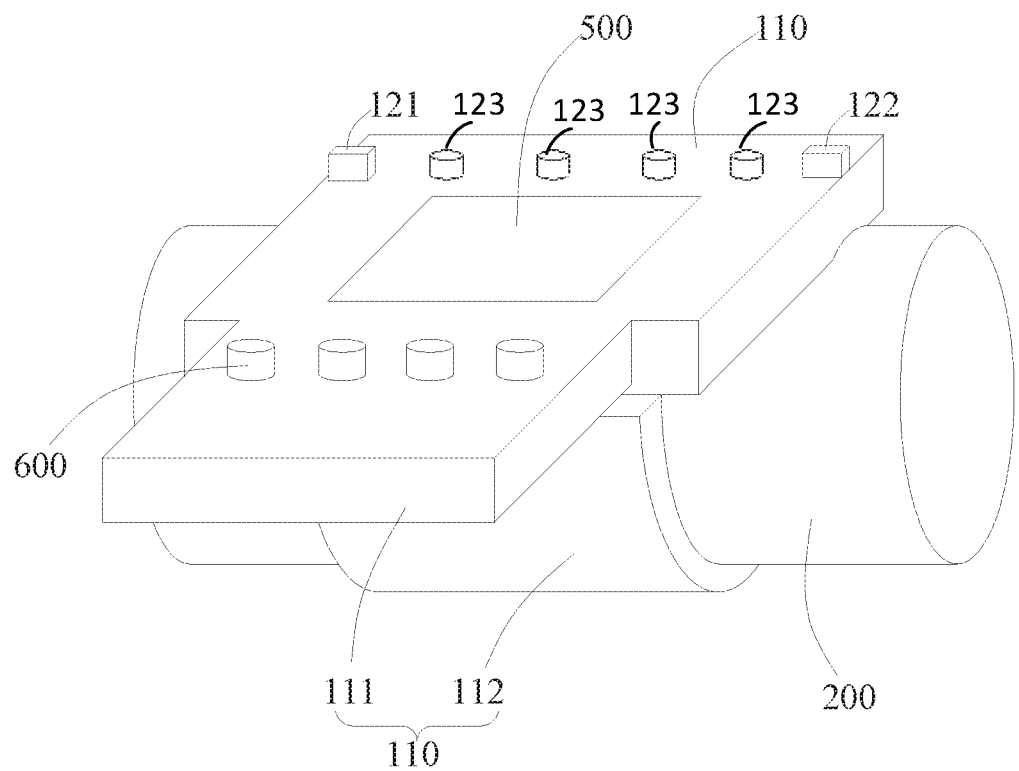
FIG. 2 is a schematic view of a structure of a flowrate measurement device according to the present disclosure.

In a case that a flowrate of a fluid inside a pipe is measured by using the flowrate measurement device, as shown in FIG. 1 and FIG. 2, the flowrate measurement device is attached to the pipe through the attachment portion 110. The plurality of signal receivers are sequentially arranged along an axial direction of the pipe.

When the flowrate of the fluid inside the object to be measured is measured, the first ultrasonic transmitter 121 is activated and emits an ultrasonic wave signal toward the inside of a pipe 200. The ultrasonic wave signal propagates along a downstream direction, and is reflected by a pipe wall of the pipe 200 once reaching it, and received by one of the third signal receivers 123. And then, the ultrasonic wave signal is reflected again, and so on, and sequentially received by the plurality of the third signal receivers 123. During such process, time points when each of the third signal receivers 123 receives the ultrasonic wave signal are recorded. When an ultrasonic wave signal is received by the second signal receiver, the second ultrasonic transmitter 122 is subsequently activated and emits an ultrasonic wave signal toward the inside of the pipe 200. The ultrasonic wave signal propagates along an upstream direction, and is reflected by the pipe wall of the pipe 200 once reaching it, and received by one of the third signal receivers 123. And then, the ultrasonic wave signal is reflected again, and so on, and sequentially received by the plurality of the third signal receivers 123. During such process, time points when each of the third signal receivers 123 receives the ultrasonic wave signal are recorded and a time point when the first signal receiver receives the ultrasonic wave signal is recorded separately. A time interval $\Delta t$ between emission of the ultrasonic wave signal by the first ultrasonic transmitter and reception of the ultrasonic wave signal by the first signal receiver may be calculated according to a built-in algorithm.

It can be understood that, in order to enable the signal receivers to receive the ultrasonic wave signal reflected from the object to be measured, an emission angle of the first ultrasonic transmitter is set to be adjustable, and an emission angle of the second ultrasonic transmitter is set to be adjustable. By adjusting the emission angle of the first ultrasonic transmitter and the emission angle of the second ultrasonic transmitter, the signal receivers may receive the ultrasonic wave signal reflected from the object to be measured. Therefore, the emission angles of the first ultrasonic transmitter 121 and the second ultrasonic transmitter 122 may be obtained easily.

A size of the object to be measured (at least a size perpendicular to a flow direction of the fluid) may be obtained by using a trigonometric function according to a position of the first ultrasonic transmitter 121, the emission angle of the first ultrasonic transmitter, and a position of the third signal receiver 123 that receives the ultrasonic wave signal. Specifically, in a cross-sectional view of the pipe shown in FIG. 1, the size of the object to be measured may be obtained by using a trigonometric function according to the position of the first ultrasonic transmitter 121, the emission angle of the first ultrasonic transmitter, and the position of the third signal receiver 123 that first receives the ultrasonic wave signal.

After the size of the object to be measured, the time point when the first ultrasonic transmitter emits the ultrasonic wave signal, the time point when the second ultrasonic transmitter emits the ultrasonic wave signal, and the time points when each of the signal receivers receives the ultrasonic wave signal are determined, the flowrate of the fluid in the object to be measured may be calculated according to any one of a propagation velocity method, a Doppler method, a beam offset method, a noise method, a correlation method, a flow velocity and cross section method and the like.

It can be seen that it is unnecessary to obtain the size of the object before measuring the flow velocity of the fluid inside the object by using the flowrate measurement device. Since the size of the object may be obtained from the flowrate measurement device itself, the flowrate measurement device may be used to measure an object with no size marked thereon, which extends an application scope of the flowrate measurement device.

A step of determining the size of the object according to the position of the third signal receiver 123 that receives the ultrasonic wave signal is illustrated below according to the specific implementation shown in FIG. 1. Specifically, the object shown in FIG. 1 is a pipe, and therefore it is necessary to determine a diameter of the pipe.

In the specific implementation shown in FIG. 1, the plurality of third signal receivers 123 include a third signal receiver 123 disposed at a position of 1#, a third signal receiver 123 disposed at a position of 2#, a third signal receiver 123 disposed at a position of 3#, a third signal receiver 123 disposed at a position of 4#, a third signal receiver 123 disposed at a position of 5# . . . and a third signal receiver 123 disposed at a position of N#, respectively.

In a case that the emission angle of the first ultrasonic transmitter 121 is $\theta 1$ and the third signal receiver 123 at the position of 1# first receives the ultrasonic wave signal emitted by the first ultrasonic transmitter 121, a pipe diameter D1 may be calculated according to a trigonometric function.

In a case that the emission angle of the first ultrasonic transmitter 121 is $\theta 2$ and the third signal receiver 123 at the position of 3# first receives the ultrasonic wave signal emitted by the first ultrasonic transmitter 121, a pipe diameter D2 may be calculated according to the trigonometric function.

It can be seen that, since the flowrate measurement device is provided with the plurality of signal receivers 123, the diameter D1 or D2 of the pipe to be measured may be measured as long as it is within a certain range. Of course, the flowrate measurement device can measure an object with a known size.

Since the ultrasonic wave signals are used for the measurement, it is only necessary to attach the flowrate measurement device outside the object to be measured when the fluid inside the object to be measured is measured. Accordingly, the flowrate measurement device according to the present disclosure makes no limitation to properties of the fluid inside the object. For example, the fluid may be a liquid capable of conducting ultrasonic wave signals, such as water, acid-base solutions, and organic solutions.

In some cases, a device including the object to be measured usually has a built-in flowrate measurement device. With the use of the device, an accuracy of the built-in flowrate measurement device will be reduced. Therefore, the flowrate of the fluid inside the object in the device is periodically measured by using the flowrate measurement device according to the present disclosure, and is compared with a flowrate measured by the built-in flowrate measurement device, so as to determine whether the built-in flowrate measurement device is accurate or not, and calibrate the built-in flowrate measurement device accordingly, thereby reducing a deviation caused when the built-in flowrate measurement device performs flowrate measurement.

It will be readily understood that each of the first signal receiver, the second signal receiver and the third signal receivers generates a corresponding electrical signals when receiving the ultrasonic wave signal.

The present disclosure makes no limitation to how to calculate the flowrate of the fluid in the object to be measured. For example, all of the first signal receiver, the second signal receiver, the third signal receivers, the first ultrasonic transmitter, and the second ultrasonic transmitter may be electrically connected to an external computing device, which may calculate the flowrate of the fluid inside the object to be measured and the size of the object to be measured according to the received electrical signals.

In order to increase integration degree of the flowrate measurement device, the flowrate measurement device further includes a controller. The controller may determine the size of the object to be measured according to the position of the third signal receiver that receives the ultrasonic wave signal reflected from the object to be measured, and determine the flowrate of the fluid inside the object to be measured according to the time when the first ultrasonic transmitter emits the ultrasonic wave signal, the time when the ultrasonic wave signal is received by the first signal receiver, and the size of the object to be measured.

It should be noted that the controller may be implemented by hardware, software, or a combination of hardware and software. In one embodiment, the controller can be implemented by an integrated circuit (IC) having corresponding functions. For example, the controller can be a central processing unit, a microprocessor or a graphics processing unit. In another embodiment, the controller can be implemented by a computer and software stored in a memory of the computer.

The present disclosure makes no limitation to a method of calculating the flowrate of the fluid in the object to be measured. For example, the flowrate of the fluid in the object to be measured may be calculated with a flow velocity method. Specifically, when the object to be measured is a pipe, the flowrate of the fluid in the object to be measured may be calculated according to the following formula (1):

$$Q = Agu = \frac{\pi D^2}{4} g \frac{C_0^2 \sin\theta}{2D \cos\theta} \Delta t \qquad (1)$$

where Q is the flowrate;
A is a cross-sectional area of the pipe;
u is a flow velocity of the fluid inside the pipe;
D is a diameter of the pipe;
θ is an emission angle of the first ultrasonic transmitter, and is an angle between an emission direction of the first ultrasonic transmitter and a vertical direction;
$C_0$ is a speed at which sound travels in a fluid; and
Δt is a time interval between emission of the ultrasonic wave signal by the first ultrasonic transmitter and reception of the ultrasonic wave signal by the first signal receiver.

It is easy to be understood that, a thickness of the pipe wall is negligible when the flowrate of the fluid in the pipe is calculated by using the flow velocity method.

In a case that a flowrate of the fluid in the pipe 200 is measured, a magnitude of θ is θ1. In a case that a flowrate of the fluid in a pipe 300 is measured, a magnitude of θ is θ2.

Figure 3:
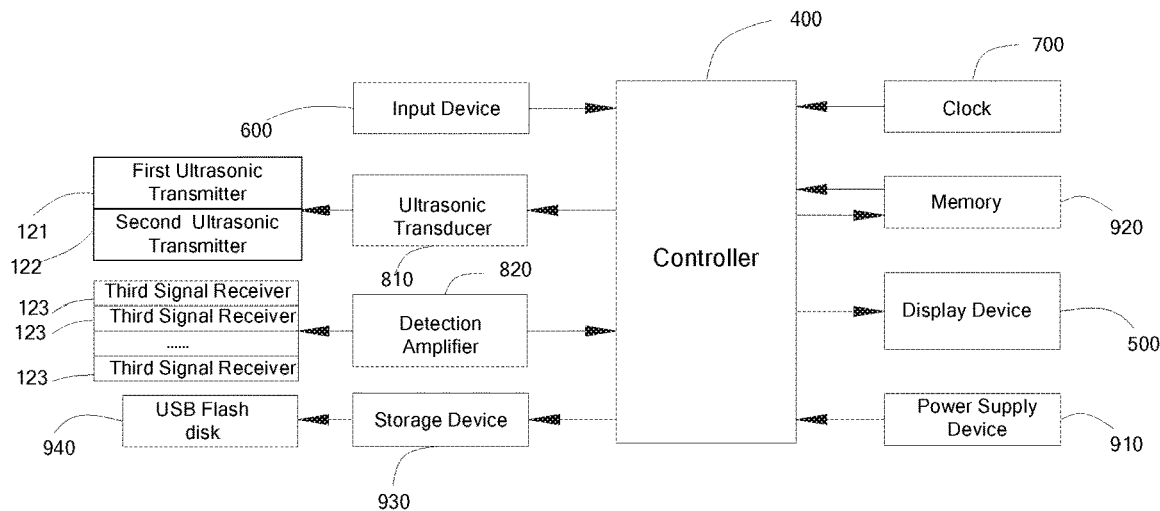
FIG. 3 is a block diagram illustrating modules of a flowrate measurement device according to the present disclosure.

In order to improve intelligence and integration of the flowrate measurement device, as shown in FIG. 3, the flowrate measurement device further includes a controller 400 for calculating the flowrate of the fluid in the object to be measured according to formula (1).

When the object to be measured is a pipe, the controller 400 may calculate the diameter of the object to be measured according to the following formula (2):

$$D = \frac{L}{2 \tan\theta} \qquad (2)$$

where L is a distance between the first ultrasonic transmitter and a third signal receiver that first receives the ultrasonic wave signal reflected from the pipe wall after the first ultrasonic transmitter emits the ultrasonic wave signal.

In the present disclosure, all the third signal receivers 123 are located at preset positions, and the first ultrasonic transmitter 121 is separated from the third signal receivers 123 by preset distances. Therefore, it is easy to obtain the distance L between the first ultrasonic transmitter and the third signal receiver that first receives the ultrasonic wave signal reflected from the pipe wall after the first ultrasonic transmitter emits the ultrasonic wave signal.

The emission angle of the first ultrasonic transmitter 121 is set to be adjustable, which can increase the application scope of the flowrate measurement device.

For facilitating setting and calculation of the distance between the first ultrasonic transmitter and the third signal receiver that first receives the ultrasonic wave signal reflected from the pipe wall after the first ultrasonic transmitter emits the ultrasonic wave signal, for example, the plurality of third signal receivers 123 are evenly spaced. Or, the plurality of third signal receivers, the first ultrasonic transmitter, and the second ultrasonic transmitter are evenly spaced.

By setting the first ultrasonic transmitter, the plurality of third signal receivers, and the second ultrasonic transmitter at equal intervals therebetween, all the receivers may be activated in a case that a small diameter is measured, thereby improving measurement accuracy. In a case that a large diameter is measured, only some of the receivers need to be activated after the angles of the transmitters are adjusted, so as to meet measurement requirements of large diameter.

For ease of observation, the flowrate measurement device includes a display device 500 for displaying measurement results which may include the diameter of the object to be measured and/or the flowrate of the fluid in the object to be measured.

Of course, the display device may also display other information, such as the position number of the third signal receiver that first receives the ultrasonic wave signal emitted by the first ultrasonic transmitter 121.

For ease of observation and measurement of the flowrate of the fluid in the object, the flowrate measurement device further includes a storage device 930 for storing the measurement results. Data stored in the storage device 930 can be output to a USB flash disk 940 for subsequent processing such as data sharing and data analysis.

The flowrate measurement device may further include a memory 920 for storing data such as code parameters of the controller 400.

The present disclosure makes no limitation to specific structures of the attachment portion 110. For example, in one embodiment of the present disclosure, as shown in FIG. 2, the attachment portion 110 includes a mounting plate 111 and two clamping plates 112 separately disposed on two sides of the mounting plate 111. The measurement portion is mounted on the mounting plate 111, and a gap between the two clamping plates 112 is adjustable.

Since the gap between the two clamping plates 112 is adjustable, the flowrate measurement device may be attached on pipes with different pipe diameters.

In a case that a pipe with a relatively small pipe diameter is measured, the gap between the two clamping plates 112 can be reduced. In a case that a pipe with a relatively large pipe diameter is measured, the gap between the two clamping plates 112 can be increased.

No limitation is made to how to adjust the gap between the clamping plates 112. For example, a sliding slot may be provided on the mounting plate 111, and a slider that can slide in the sliding slot may be provided on at least one clamping plate 112, so as to make a position of the clamping plate 112 adjustable.

In the present disclosure, the flowrate measurement device can be powered by an external power supply. For ease of use, the flowrate measurement device further includes a power supply device 910 for supplying power to the flowrate measurement device.

For ease of control, as shown in FIG. 2 and FIG. 3, the flowrate measurement device further includes an input device 600 for inputting operation instructions.

The operation instructions are input for the controller 400. For example, the operation instructions may include at least one of a measurement start instruction, a data output instruction, a data storage instruction, a power-on instruction, and a shutdown instruction. The present disclosure makes no limitation to specific types of the input device 600, so that the input device 600 may include at least one of keys, a mouse, and a touch screen.

The flowrate measurement device further includes a clock 700 for recording the time point when each of the signal receiver receives the ultrasonic wave signal, and generating timings to control the controller 400.

The present disclosure makes no limitation to ways of generating the ultrasonic wave signals. In one embodiment, as shown in FIG. 3, the flowrate measurement device includes an ultrasonic transducer 810 for generating the ultrasonic wave signals. The ultrasonic transducer 810 includes two output terminals, one of which is coupled to the first ultrasonic transmitter 121, and the other is coupled to the second ultrasonic transmitter 122.

In order to improve the measurement accuracy, the flowrate measurement device may further include a detection amplifier 820 electrically coupled to an output terminal of each signal receiver 123, so as to amplify signals output from the third signal receivers 123, so that the position of the signal receiver that receives the ultrasonic wave signal may be determined more accurately.

Figure 4:
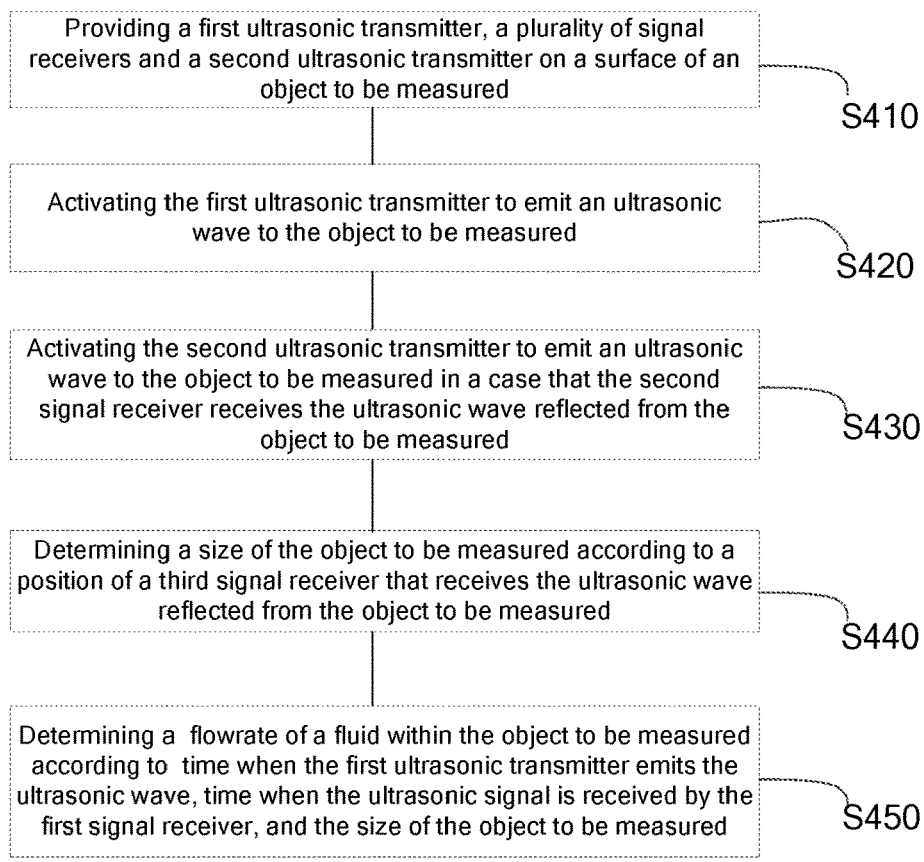
FIG. 4 is a flow chart illustrating a flowrate measurement method according to the present disclosure.

According to an embodiment of the present disclosure, a flowrate measurement method is provided. As shown in FIG. 4, the flowrate measurement method includes Steps S410, S420, S430, S440 and S450.

In Step S410, a first ultrasonic transmitter, a plurality of signal receivers and a second ultrasonic transmitter are provided on a surface of an object to be measured. The signal receivers may receive an ultrasonic wave signal reflected from the object to be measured. The plurality of signal receivers include a first signal receiver disposed at a same position as the first ultrasonic transmitter, a second signal receiver disposed at a same position as the second ultrasonic transmitter, and a plurality of third signal receivers between the first signal receiver and the second signal receiver.

In Step S420, the first ultrasonic transmitter is activated to emit an ultrasonic wave signal to the object to be measured.

In Step S430, the second ultrasonic transmitter is activated to emit an ultrasonic wave signal to the object to be measured in a case that the second signal receiver receives the ultrasonic wave signal reflected from the object to be measured.

In Step S440, a size of the object to be measured is determined according to a position of a third signal receiver that receives the ultrasonic wave signal reflected from the object to be measured.

In Step S450, a flowrate of the fluid in the object to be measured is determined according to time when the first ultrasonic transmitter emits the ultrasonic wave signal, time when the ultrasonic wave signal is received by the first signal receiver, and the size of the object to be measured.

The above flowrate measurement method according to the present disclosure is performed without knowing the size of the object in advance.

In one embodiment, the flowrate measurement method may be implemented by using the aforesaid flowrate measurement device according to the present disclosure.

In one embodiment, the object to be measured is a pipe, and correspondingly Step S450 may comprise calculating the flowrate of the fluid in the object to be measured according to formula (1) provided above.

Correspondingly, in Step S440, the diameter of the object to be measured may be calculated by using the formula (2) provided above.

Since the ultrasonic wave signals are used for the measurement, it is only necessary to attach the flowrate measurement device outside the object to be measured when the fluid inside the object to be measured is measured. Accordingly, the flowrate measurement device according to the present disclosure makes no limitation to properties of the fluid inside the object. Moreover, since the plurality of third signal receivers are provided in the flowrate measurement device, the size of the object may be determined according to the position of the third signal receiver that receives the ultrasonic wave signal in a case that the object to be measured has an unknown size, so that the flowrate measurement device can perform flowrate measurement to the object with an unknown size.

It should be understood that the above implementations are merely exemplary implementations for the purpose of illustrating the principles of the present disclosure, but the present disclosure is not limited thereto. Those skilled in the art may make various variations and improvements without departing from the spirit and essence of the present disclosure, and these variations and improvements shall be considered to fall into the protection scope of the present disclosure.

What is claimed is:

1. A flowrate measurement device comprising an attachment portion configured to attach the flowrate measurement device to a pipe, and a measurement portion, wherein the measurement portion comprises a first ultrasonic transmitter, a second ultrasonic transmitter and a plurality of signal receivers; the plurality of signal receivers are equally spaced apart from each other; the first ultrasonic transmitter, the second ultrasonic transmitter and the plurality of the signal receivers are all disposed on the attachment portion, such that both the first ultrasonic transmitter and the second ultrasonic transmitter are capable of emitting an ultrasonic wave signal to the pipe, and the plurality of signal receivers are capable of receiving an ultrasonic wave signal reflected from the pipe; the plurality of signal receivers comprise a first signal receiver disposed at a same position as the first ultrasonic transmitter, a second signal receiver disposed at a same position as the second ultrasonic transmitter, and a plurality of third signal receivers between the first signal receiver and the second signal receiver;

the first ultrasonic transmitter is configured to emit an ultrasonic wave signal to the pipe; and the second ultrasonic transmitter is configured to emit an ultrasonic wave signal when the second signal receiver receives the ultrasonic wave signal reflected from the pipe, and wherein the flowrate measurement device further comprises a controller configured to determine a diameter of the pipe according to a position of a third signal receiver that receives the ultrasonic wave signal reflected from the pipe and determine a flowrate of a fluid in the pipe according to a time difference over which the first ultrasonic transmitter emits a first ultrasonic wave signal, the first ultrasonic wave signal is received by the second signal receiver at the second ultrasonic transmitter, the second ultrasonic wave transmitter emits a second ultrasonic wave signal and the second ultrasonic wave signal is received by the first signal receiver at the first ultrasonic transmitter, and the diameter of the pipe, the time difference beginning when the first ultrasonic transmitter emits the first ultrasonic wave signal and ending when the second ultrasonic wave signal is received by the first signal receiver at the first ultrasonic transmitter.

2. The flowrate measurement device according to claim 1, wherein the controller is configured to calculate the flowrate of the fluid in the pipe according to the following formula:

$$Q = Agu = \frac{\pi D^2}{4} g \frac{C_0^2 \sin\theta}{2D \cos\theta} \Delta t;$$

where Q is the flowrate;

A is a cross-sectional area of the pipe;

u is a flow velocity of a fluid in the pipe;

D is a diameter of the pipe;

$\theta$ is an emission angle of the first ultrasonic transmitter, and is an angle between an emission direction of the first ultrasonic transmitter and a vertical direction;

$C_0$ is a speed at which sound travels in the fluid;

g is the acceleration of gravity; and $\Delta t$ is a time interval between emission of the first ultrasonic wave signal by the first ultrasonic transmitter and reception of the second ultrasonic wave signal by the first signal receiver.

3. The flowrate measurement device according to claim 2, wherein the emission angle of the first ultrasonic transmitter is adjustable, and an emission angle of the second ultrasonic transmitter is adjustable, and the controller is configured to calculate a diameter of the pipe according to the following formula:

$$D = \frac{L}{2 \tan\theta},$$

where L is a distance between the first ultrasonic transmitter and a third signal receiver that first receives the first ultrasonic wave signal reflected from a pipe wall after the first ultrasonic transmitter emits the first ultrasonic wave signal.

4. The flowrate measurement device according to claim 1, further comprising a display device for displaying a measurement result.

5. The flowrate measurement device according to claim 1, further comprising a storage device for storing a measurement result.

6. The flowrate measurement device according to claim 1, wherein the attachment portion comprises a mounting plate and two clamping plates separately disposed on two sides of the mounting plate, the measurement portion is mounted on the mounting plate, and a gap between the two clamping plates is adjustable.

7. The flowrate measurement device according to claim 1, further comprising a power supply device for supplying power to the flowrate measurement device.

8. The flowrate measurement device according to claim 1, further comprising an input device for inputting an operation instruction.

9. A flowrate measurement method, comprising steps of:

providing a first ultrasonic transmitter, a plurality of signal receivers and a second ultrasonic transmitter on a surface of a pipe, wherein the plurality of signal receivers are capable of receiving an ultrasonic wave signal reflected from the pipe, and the plurality of signal receivers comprises a first signal receiver disposed at a same position as the first ultrasonic transmitter, a second signal receiver disposed at a same position as the second ultrasonic transmitter, and a plurality of third signal receivers equally spaced between the first signal receiver and the second signal receiver;

activating the first ultrasonic transmitter to emit a first ultrasonic wave signal into the pipe;

activating the second ultrasonic transmitter to emit a second ultrasonic wave signal into the pipe when the second signal receiver receives the first ultrasonic wave signal reflected from the pipe;

determining a diameter of the pipe according to a position of a third signal receiver that receives the first ultrasonic wave signal reflected from the pipe; and determining a flowrate of a fluid in the pipe according to a time difference over which the first ultrasonic transmitter emits a first ultrasonic wave signal, the first ultrasonic wave signal is received by the second signal receiver at the second ultrasonic transmitter, the second ultrasonic wave transmitter emits a second ultrasonic wave signal and the second ultrasonic wave signal is received by the first signal receiver at the first ultrasonic transmitter, and the diameter of the pipe, the time difference beginning when the first ultrasonic transmitter emits the first ultrasonic wave signal and ending when the second ultrasonic wave signal is received by the first signal receiver at the first ultrasonic transmitter.

10. The flowrate measurement method according to claim 9, the step of determining the flowrate of the fluid in the pipe includes calculating the flowrate according to the following formula:

$$Q = Agu = \frac{\pi D^2}{4} g \frac{C_0^2}{2D} \frac{\sin\theta}{\cos\theta} \Delta t;$$

where Q is the flowrate;
A is a cross-sectional area of the pipe;
u is a flow velocity of a fluid in the pipe;
D is a diameter of the pipe;
θ is an emission angle of the first ultrasonic transmitter, and is an angle between an emission direction of the first ultrasonic transmitter and a vertical direction;
$C_0$ is a speed at which sound travels in a fluid;
g is the acceleration of gravity; and
Δt is a time interval between emission of the first ultrasonic wave signal by the first ultrasonic transmitter and reception of the second ultrasonic wave signal by the first signal receiver.

11. The flowrate measurement method according to claim 10, wherein the step of determining the diameter of the pipe according to the position of the third signal receiver that receives the first ultrasonic wave signal reflected from the pipe comprises calculating the diameter of the pipe according to the following formula:

$$D = \frac{L}{2\tan\theta},$$

where L is a distance between the first ultrasonic transmitter and the third signal receiver that first receives the first ultrasonic wave signal reflected from the pipe wall after the first ultrasonic transmitter emits the first ultrasonic wave signal.

12. The flowrate measurement method according to claim 9, wherein the ultrasonic wave signal reflected from the pipe is received by the signal receivers by adjusting an emission angle of the first ultrasonic transmitter and an emission angle of the second ultrasonic transmitter.

13. The flowrate measurement method according to claim 9, wherein the plurality of third signal receivers, the first ultrasonic transmitter, and the second ultrasonic transmitter are evenly spaced.

\* \* \* \* \*